United States Patent [19]

Banno

[11] 4,204,594

[45] May 27, 1980

[54] ROLLER OF A SYNTHETIC RESIN USED FOR A BELT-CONVEYOR

[76] Inventor: Hirokazu Banno, 8, Katasaka, Arao-cho, Toukai-shi, Aichi-ken, Japan

[21] Appl. No.: 885,253

[22] Filed: Mar. 10, 1978

[30] Foreign Application Priority Data

Nov. 26, 1977 [JP] Japan ................................. 52-158437

[51] Int. Cl.² ...................... B65G 15/08; B65G 39/10
[52] U.S. Cl. ................................. 198/827; 308/187.1
[58] Field of Search ............... 198/824, 825, 827, 842; 193/37; 308/20, 190, 191, 195, 187.1; 29/116 R, 132

[56] References Cited

U.S. PATENT DOCUMENTS

| 909,833 | 1/1909 | Vrooman | 198/827 |
|---|---|---|---|
| 2,476,193 | 7/1949 | Hirschmugl | 308/190 X |
| 3,782,779 | 1/1974 | Britnell | 308/190 X |
| 3,786,549 | 1/1974 | Pott | 29/132 X |

*Primary Examiner*—James L. Rowland
*Attorney, Agent, or Firm*—Browdy and Neimark

[57] ABSTRACT

A roller made of a synthetic resin, used for a belt-conveyor, by means of utilizing insert-forming injection molding, placing a thin-walled metallic housing for containing a roller bearing therein, at the innermost boss portion, for concentrically forming a roller body integrally with the metallic housing. The inner race of the bearing is press-fitted onto the roller shaft, and the outer race thereof is press-fitted inside the metallic housing. A roller of such a construction will resist or absorb most of the inherently large thermal expansion and contraction of a synthetic resin made article, and thus enables the life of the resin made rollers to be elongated far beyond expectation.

5 Claims, 6 Drawing Figures

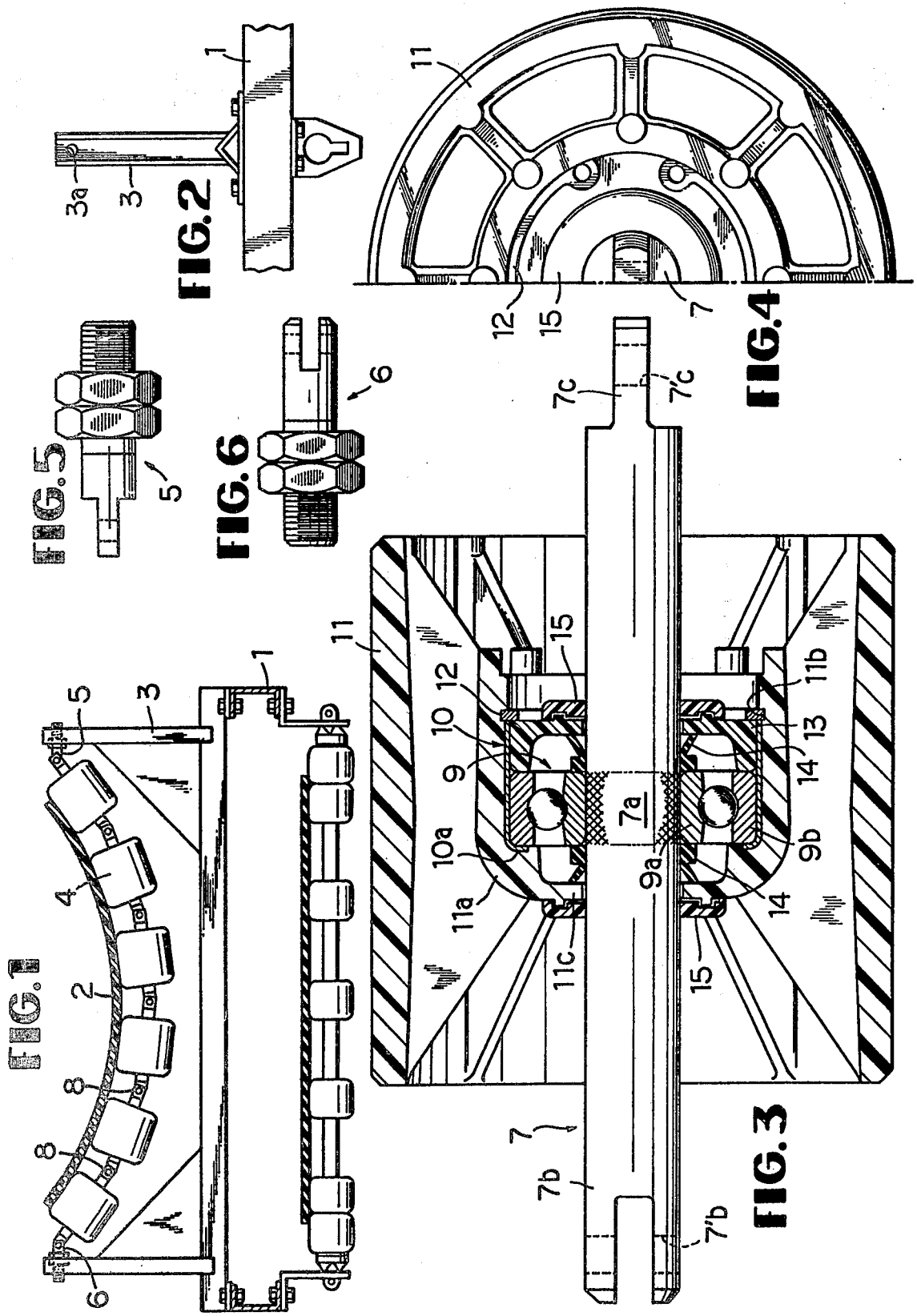

4,204,594

ROLLER OF A SYNTHETIC RESIN USED FOR A BELT-CONVEYOR

BACKGROUND OF THE INVENTION

This invention relates to a roller made of synthetic resin used in a belt-conveyor and, more particularly, to an improved roller made of synthetic resin, in which a ball-bearing assembly (hereinafter simply called bearing) may not be affected by the variation of clamping force acted thereon through expansion and contraction of the synthetic resin, which is very unfavorable to the bearing function in prior art rollers. It is an object of the present invention to obtain a carrier roller of low noise, low power consumption, and particularly long life by employing an insert-injection molding with a material which is suited for the molding process, inexpensive, and light in weight.

As materials for belt-conveyor carrier rollers, metals, rubbers, or synthetic resins have been conventionally utilized, in general, although belt-conveyors used for construction work or civil engineering mostly metallic rollers. This can chiefly be attributed to higher strength, less wearing, and greater durability of the metallic materials. Metal rollers are however not free from some disadvantages, such as noises, heavy weight of the rotatable portion, which causes an increase of rolling resistance accompanied by the running resistance of the entire conveyor system. It consequently brings about an increase in the resultant power consumed, equipment cost, and also running cost. Attempts at eliminating these disadvantages have turned conveyor makers to a material change, from metals to synthetic resins or rubbers, with some success indeed, such as noise decrease and weight decrease of the rolling parts. Irrespective of these merits and further secondary favorable effects of decrease of running resistance or power saving, some dissatisfactions have still been left unsolved in strength and, durability as well as in maintenance. Particularly, synthetic resins produced by the injection method are subjected to so-called post-shrinkage during a fairly long time after molding, in addition to the well-known molding shrinkage at the time of the injection process. In a roller, wherein a bearing assembly is fitted thereinto, fluctuation of the bearing-sustaining power owing to the thermal expansion or contraction of the synthetic resin, along with the abovementioned post-shrinkage, will cause slipping or skidding of the bearing sustaining portion, even when the bearing is forcedly fitted into the roller after it has been fully machined. Once this skidding occurs, smooth rotation of the roller is hindered to extremely shorten the life of the bearing.

SUMMARY OF THE INVENTION

It is an essential object of this invention to provide a roller made of a synthetic resin which largely eliminates disadvantages accompanied by the prior art.

It is a primary object of this invention to provide a roller made of a synthetic resin which, by means of skillful treating of the inherently inferior feature of the synthetic resins in the thermal expansion and contraction, is perfectly resistant against the thermal expansion and contraction.

It is another important object of this invention to provide a roller made of a synthetic resin which will resist and absorb the expansion and contraction (shrinkage) of the molded roller by means of ingeniously applying the insert-molding of a metallic housing, wherein the same is placed in advance in the central portion of a die and integrally molded with the roller body.

It is still another object of this invention to provide a roller made of a synthetic resin, wherein the metallic housing integrally molded with the roller body is capable of perfectly protecting the rotary bearing contained therein by means of preventing the big difference between expansion and contraction (shrinkage) of the synthetic resin moldings from being delivered directly to the bearing outer race.

BRIEF DESCRIPTION OF THE DRAWINGS

FIG. 1 is a vertical cross section of a belt-conveyor incorporating rollers of this invention;

FIG. 2 is a side view of an essential part of the belt-conveyor in FIG. 1;

FIG. 3 is an axial cross section of a roller in accordance with this invention;

FIG. 4 is a front elevation of a roller of this invention by half;

FIG. 5 is a side view of a male shape fastening means; and

FIG. 6 is a side view of a female shape fastening means.

DETAILED DESCRIPTION OF THE PREFERRED EMBODIMENT

In FIG. 1, on a frame 1 are disposed a plurality of stands 3 on either side end of the frame sandwiching an endless belt therebetween, with a predetermined distance to each other in the longitudinal direction. Near the top of each of a pair of stands 3 mounted in confrontation, is formed a bore 3a for attaching either a male or female shape fastening means 5, 6, in order to sustain a series of carrier rollers, i.e., a rosary-like chain of rollers coupled to each other. These fastening means are respectively provided with a threaded portion and double nuts for rendering fastening to and unfastening from the stand 3 quick and easy. Each roller is provided with a relatively short shaft 7, as can be seen in FIG. 3, the middle portion of which shaft 7 is formed with jagged or rough portion 7a by knurling. The inner race of a bearing (ball or roller bearing, in general rotary bearing) will be securely fitted on this knurled portion 7a. The shaft 7 is formed into a (female) groove 7b on one end, and into a (male) protrusion 7c on the other end thereof, for enabling these portions 7b and 7c to be coupled by fitting, in a mortise joint, pivotally flexible only in one plane. At each engaging position of the coupling portions a bore is drilled 7'b, 7'c for allowing a spring pin 8 (in FIG. 1) to pass therethrough in a perpendicular direction to the engaging plane, with this spring pin 8 the shaft 7 being pivotally coupled to one another to form a chain-like series of rollers.

The inner race 9a of a bearing 9 is force-fitted onto the knurled portion 7a of the shaft 7 and the outer race 9b thereof is securely fitted to the inside of a housing 10, which is a cylindrical body of thin wall, press-formed of a steel plate, and having a flanged portion 10a bent inwards perpendicularly on one end thereof. The roller body 11 of nylon formed by an injection molding method contains the abovementioned housing 10, which is insert-molded concentrically inside the boss portion 11a of the roller body 11. Close to the open and unbent end portion of the housing 10 is formed a circular groove 11b around the inside of the boss portion 11a, into which a snap ring 12 is fitted. An axial gap or space between this snap ring 12 and the outer race 9b of the bearing 9 is plugged with a bush 13 of nylon having enough width to fill there. The outer race 9b of the bearing 9 is securely sandwiched, being unable to laterally shift, by the flange portion 10a on one side and the snap ring 12, via the bush 13, on the other side. On either end of the inner race 9a of the bearing are attached V-shaped rubber rings 14, one of which seals oil-tightly a gap between a flange portion 11c of the boss portion 11a and the shaft 7, and the other of which seals oil-tightly a gap between the bush 13 and the shaft 7. On either side of the boss portion 11a is mounted a labyrinth collar 15 made of polyacetal for the purpose of preventing the air flow-in and ingress of dust. Each collar 15 has groove inside formed concentrically with the shaft 7 for being loosely fitted, with a narrow gap, by a ring-like rib on the flange portion 11c and the bush 13, respectively.

A series of rollers 4 having such a structure, when mounted on a belt-conveyor, are spanned in suspension, between a pair of stands 3, forming a certain concave curve with the load as well as its empty weight. The series of rollers 4, connected in a chain-like manner by the roller shafts 7, form a broken-line curve, which is quite flexible in the line-containing or vertical plane but highly resistive against a bending in the perpendicular direction to the plane. Such a construction of the belt-conveyor ensures an extremely stabilized and steady suspension posture of the entire system during the operation.

Besides, the boss portion 11a is protected by a pair of labyrinth collars 15 from the ingress of dust and also protected by a pair of V-shape rings 14 from the escape of the sealed grease.

Regarding the structure and function of the housing 10, one of the important factors of this invention, some comments will be stated hereunder. Injection molding of plastics is generally a forming operation by injecting a heated material in a molten state into a pre-closed die (or dies), wherein the material temperature ranges from 125° C. to 275° C. and the injection pressure is as high as over 1,000 Kg/cm$^2$. The molded articles are subjected to various contraction or shrinkage, such as forming shrinkage, contraction due to after shrinkage, etc., for a considerably long period of time after the molding process.

The housing 10, which has been insert-molded, has to sustain the pressure, constantly coming from the outer side due to the abovementioned forming shrinkage and the after contraction, to protect and guard the bearing 9 from being directly affected by the outer pressure. The housing 10 largely mitigates the influence of the contraction pressure on to the bearing 9 for favorably maintaining the rolling function of the rollers.

Generally speaking, plastics are very large in the modulus of expansion, being about ten times as large as that of iron (linear rate of expansion is $11.7 \times 10^{-6}$ mm/°C.). Such a large expansion rate of the roller body made of nylon must be, considering the high temperature during the operation of the belt-conveyor due to the friction, fully taken into account. The insert-molded housing 10 of a metallic material is sufficiently strong to resist the inward pressure, while contraction of the synthetic resin is taking place, and further able to allow the injection-molded (by insert-molding) roller body, even when it is expanded, favorably to leave a minimum necessary inward pressure. In other words, it can rigidly secure the metallic housing 10 regardless of large modulus of expansion and contraction of the synthetic resin. The large fluctuation of volume, enlarging and diminishing, of the synthetic roller body is successfully resisted and absorbed so as to protect the bearing 9 from being directly affected thereby. The bearing 9 thus protected by the housing 10 is ensured its long life, because there can be no fear of skidding or slippage between the housing 10 and the outer race 9b of the bearing.

The above description of the embodiment is only for providing an example for better understanding; the invention will never be limited to this embodiment or appended drawings. Various variations and modifications are thinkable for those versed in the art without departing from the scope and spirit of the invention. Some of the modifications will be outlined by way of example for this purpose.

Connecting means between the roller shafts 7 are not limited to the mortise joint shown in FIGS. 3, 5, and 6; chain connection or some other joints flexible in one plane are also practicable.

As a means of securing the inner race 9a of the bearing on the shaft 7, a knurling is being employed in this embodiment; it may be replaced by, for example, a pair of snap rings force-fitted on the shaft 7 on either side of the inner race 9a, or a shouldered shaft with a fastener.

The bush 13 may be omitted, if the snap ring 12 can directly secure the outer race 9b with certainty.

Replacement of the roller body 11 made of nylon by other suitable synthetic resins, and substitution for the steel housing by some other metallic materials are also thinkable.

The gist of this invention can thus be summarized as follows: by (1) skillfully treating the large expansion and contraction (shrinkage) rate of synthetic resins; (2) adopting the insert-molding of a metallic housing in the boss portion of the roller body; and (3) utilizing the expansion and contraction features of the synthetic resins as the bearing-race-sustaining power, the inventor has succeeded in getting an ideal roller, in which the bearing is little affected by the expansion and contraction of the body portion. The rollers in accordance with this invention are perfectly free from slipping between the roller body and the outer race of the bearing, because of the metallic housing being constantly under pressure of the synthetic resin made roller body and rigid enough to resist it. The perfectly protected bearing, due to the integral forming of the housing and the roller body, is allowed to function for a long time without being deteriorated, which ensures the longevity of the roller itself. In this way a roller light in weight, low in noise, so consequently low in friction and low in power consumption can be obtained; this simplified roller, in its structure, makes it possible to be put in a low-cost mass production line.

What is claimed is:

1. A roller made of a synthetic resin for use in rotatably carrying a belt of a conveyor, comprising:
   a short shaft having on either end portion thereof a coupling portion which permits a rotative movement only in one plane;
   a rotary bearing, the inner race of which is force-fitted onto the axially substantially middle portion of said shaft;
   a metallic housing of thin walled cylindrical shape with a flange portion on one end thereof, force-fitted onto the outer race of said rotary bearing;

a roller body made of a synthetic resin which is concentrically formed with said housing by insert forming injection molding, said housing being the insert, said roller body having an internal boss portion with a circular groove on the internal surface thereof; and a snap ring fitted into the groove in said boss portion of said roller body, said snap ring cooperating with said flange portion of said housing to secure the position of said rotary being therebetween.

2. A roller in accordance with claim 1, further including a plastic bush securely wedged between said snap ring and the outer race of said rotary bearing.

3. A roller in accordance with claim 2, wherein said boss portion extends around said flange portion of said housing into close proximity to said shaft on the side of said rotary bearing opposite said snap ring, and wherein the roller further includes first ring means for oil-tightly sealing the gap between the flange of said boss portion and said shaft and second ring means for oil-tightly sealing the gap between said bush and said shaft.

4. A roller in accordance with claim 2, further including first collar means, concentric with said shaft, connected to the surface of said bushing facing away from said rotary bearing and second collar means, concentric with said shaft, connected to the surface of the flange of said boss portion facing away from said rotary bearing, each said collar means for preventing the ingress of air and dust.

5. A roller in accordance with claim 4 wherein the contacting surfaces of said first and second collar means and said bush and the flange of said boss portion, respectively, have therein cooperating ribs and grooves to hold said collar means in place.

* * * * *